United States Patent
Ookawa et al.

(10) Patent No.: US 8,502,471 B2
(45) Date of Patent: Aug. 6, 2013

(54) PLANAR LIGHT-EMITTING MODULE LIGHTING CIRCUIT AND ILLUMINATING DEVICE

(75) Inventors: Masanao Ookawa, Nara (JP); Shin Ukegawa, Kyoto (JP); Minoru Maehara, Osaka (JP); Hirofumi Konishi, Osaka (JP); Hirofumi Takaki, Aichi (JP)

(73) Assignee: Panasonic Corporation, Kadoma-shi, Osaka (JP)

( * ) Notice: Subject to any disclaimer, the term of this patent is extended or adjusted under 35 U.S.C. 154(b) by 309 days.

(21) Appl. No.: 12/809,089

(22) PCT Filed: Dec. 18, 2008

(86) PCT No.: PCT/JP2008/073110
§ 371 (c)(1),
(2), (4) Date: Jun. 18, 2010

(87) PCT Pub. No.: WO2009/078468
PCT Pub. Date: Jun. 25, 2009

(65) Prior Publication Data
US 2011/0169422 A1 Jul. 14, 2011

(30) Foreign Application Priority Data
Dec. 19, 2007 (JP) ................................. 2007-327801

(51) Int. Cl.
*G05F 1/00* (2006.01)
*H05B 37/02* (2006.01)
*H01F 21/02* (2006.01)
*H01F 27/08* (2006.01)

(52) U.S. Cl.
USPC ............................. 315/297; 315/301; 336/30

(58) Field of Classification Search
USPC ....................... 315/297, 301, 307; 336/30, 197
See application file for complete search history.

(56) References Cited

U.S. PATENT DOCUMENTS

| | | | |
|---|---|---|---|
| 6,429,603 B1 * | 8/2002 | Tsugita et al. | 315/224 |
| 2003/0168997 A1 * | 9/2003 | Nishimoto et al. | 315/291 |
| 2006/0033452 A1 | 2/2006 | Yamazaki et al. | |
| 2009/0046087 A1 | 2/2009 | Maehara | |
| 2009/0184645 A1 * | 7/2009 | Buij et al. | 315/106 |
| 2011/0057576 A1 * | 3/2011 | Otake et al. | 315/291 |
| 2011/0169426 A1 * | 7/2011 | Sadwick et al. | 315/307 |

FOREIGN PATENT DOCUMENTS

| | | |
|---|---|---|
| JP | 2001-117535 | 4/2001 |
| JP | 2003-005697 | 1/2003 |
| JP | 2003-029710 | 1/2003 |
| JP | 2003-059650 | 2/2003 |
| JP | 2006-100796 | 4/2006 |
| JP | 2007-005259 | 1/2007 |
| JP | 2007-122981 | 5/2007 |

* cited by examiner

*Primary Examiner* — Shawki Ismail
*Assistant Examiner* — Dylan White
(74) *Attorney, Agent, or Firm* — Drinker Biddle & Reath LLP (57) ABSTRACT

A planar light-emitting module lighting circuit uses a lamp comprising an organic electroluminescence layer and electrodes sandwiching the organic electroluminescence layer as a load, and applies a current to the load so as to cause the organic electroluminescence layer to emit light. In the planer light-emitting module lighting circuit, a current at a lighting start time of the lamp is made small as compared with a current at a stationary lighting time at which a predetermined time period has passed since a lighting start.

9 Claims, 11 Drawing Sheets

PLANAR LIGHT-EMITTING MODULE LIGHTING CIRCUIT AND ILLUMINATING DEVICE

TECHNICAL FIELD

This invention relates to a planar light-emitting module lighting circuit and an illuminating device and in particular to a planar light-emitting module lighting circuit and an illuminating device which can lower the output voltage rating of a circuit and can make uniform the brightness of a lamp from lighting start to stationary lighting.

BACKGROUND ART

Figure 10:
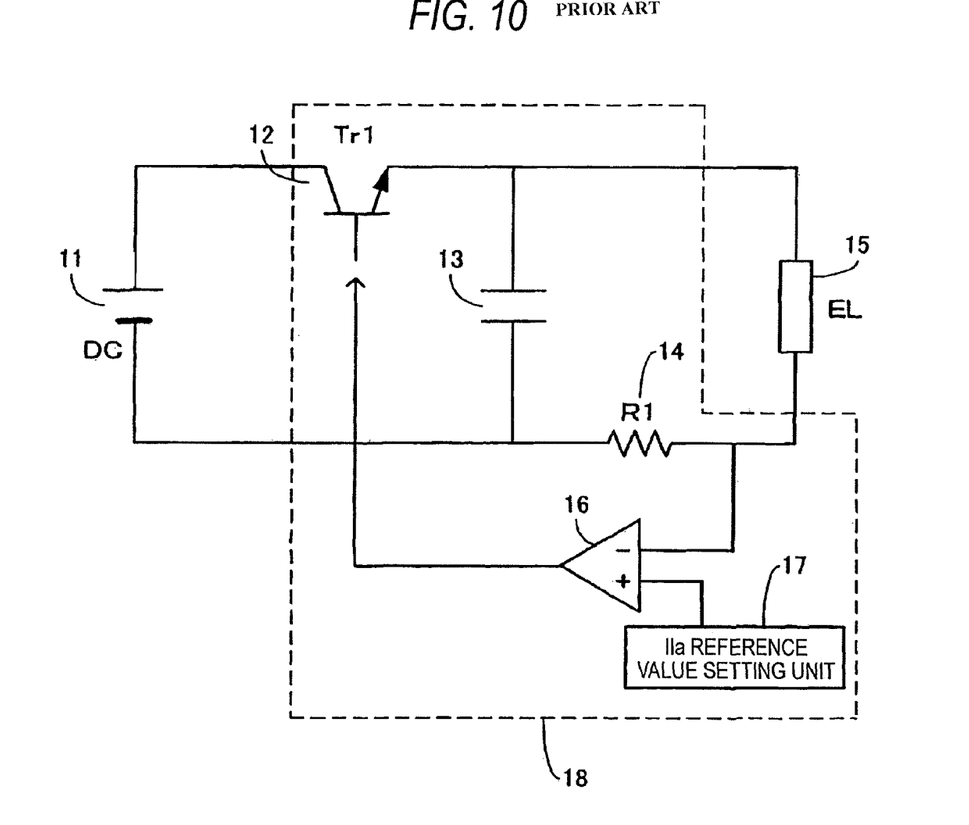
FIG. 10 is a drawing to show an example of a lighting circuit of a conventional organic electroluminescence (electroluminescence) lamp.

FIG. 10 shows an example of a lighting circuit of a conventional organic electroluminescence (electroluminescence) lamp. The conventional lighting circuit supplies a DC power source 11 to an organic electroluminescence lamp 15 by a lamp current control circuit 18. A switch Tr1 (12) is controlled based on the comparison result so that a lamp current Ila detected as a voltage value by a resistor R1 (14) and an Ila reference value set in an Ila reference value setting unit 17 preset so as to supply a rated current to the lamp become equal.

Figure 11:
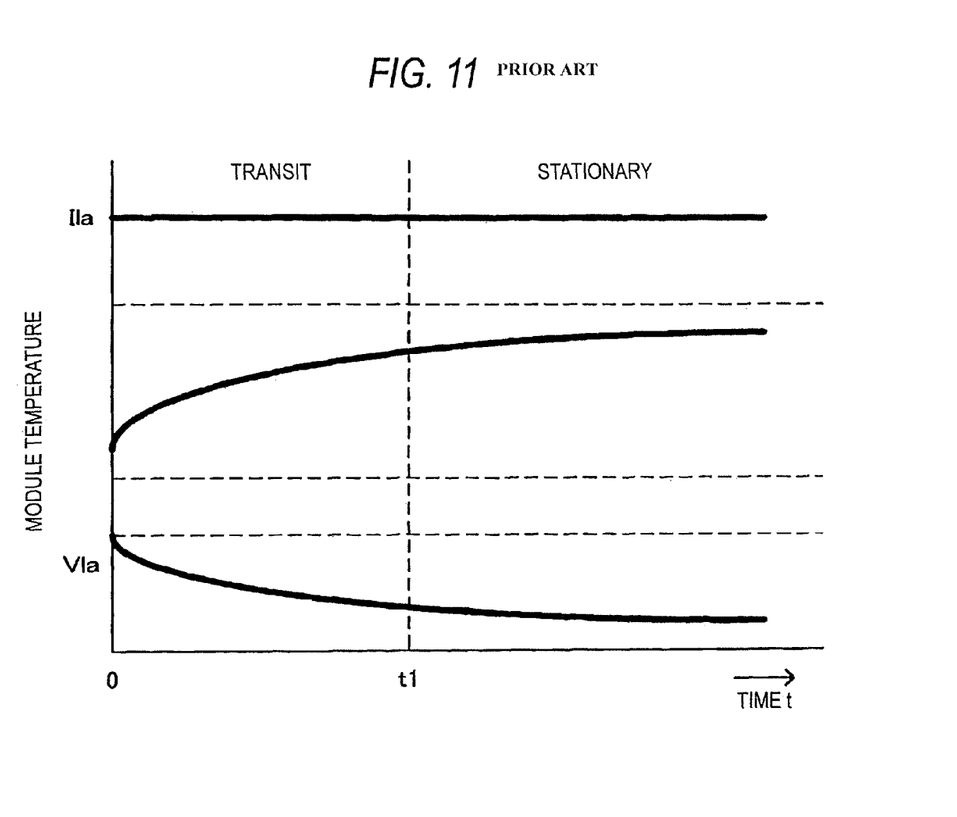
FIG. 11 is a drawing to show change in lamp current Ila, lamp (module) temperature, and lamp voltage Vla in the conventional organic electroluminescence lamp.

The lamp current Ila, the lamp (module) temperature, and lamp voltage Vla become as shown in FIG. 11. FIG. 11 shows change in the lamp current Ila, the lamp (module) temperature, and the lamp voltage Vla at the transient time from lighting start time 0 to time t1 and at the later stationary time (for example, refer to Patent Document 1).
Patent Document 1: Japanese Patent Publication No. 2007-122981

DISCLOSURE OF INVENTION

Technical Problem

As shown in FIG. 11, in the organic electroluminescence lamp, when the temperature at the lighting start time is low, impedance is high, and if lamp current Ila having a similar level to that at the rating lighting time is applied, the lamp voltage Vla becomes high as compared with that at the rating lighting time. When lighting is started, as the lamp (module) temperature rises, the impedance becomes low and the lamp voltage Vla lowers. Thus, to supply the lamp current Ila having a level at the rating lighting time just after the lighting start, the lighting circuit is required to have a capability for supplying a voltage higher than that at the rating lighting time.

In view of the circumstances described above, an object of the invention is to provide a planar light-emitting module lighting circuit and an illuminating device which can lower the voltage supply capability of a circuit by limiting lamp current during a period in which the lamp temperature rises from the lighting start and the voltage to be supplied to a load lowers.

Further, an object of the invention is to provide a planar light-emitting module lighting circuit in an illuminating device including a lighting circuits for limiting lamp current and a plurality of lamps, which can make uniform the brightness of each of the lamps from the lighting start to stationary lighting, and the illuminating device.

Means for Solving the Problem

A planar light-emitting module lighting circuit of the invention is a planar light-emitting module lighting circuit which uses a lamp comprising an organic electroluminescence layer and electrodes sandwiching the organic electroluminescence layer as a load, and which applies a current to the load so as to cause the organic electroluminescence layer to emit light, characterized in that a current at a lighting start time of the lamp is made small as compared with a current at a stationary lighting time at which a predetermined time period has passed since a lighting start.

According to the configuration, the current at the lighting start time of the lamp is made small as compared with the current at the stationary lighting time at which the predetermined time period has passed since the lighting start, whereby it is made possible to lower the output voltage rating of the circuit without raising the lamp voltage at the transient time (from the lighting start to stationary lighting).

The planar light-emitting module lighting circuit of the invention is characterized by comprising lamp voltage detection means for detecting a voltage applied to the lamp and a lamp current control circuit configured to limit a lamp current during a period in which the lamp voltage is equal to or more than a predetermined value.

According to the configuration, the lamp current is limited while the lamp voltage is equal to or more than the predetermined value, so that it is made possible to lower the output voltage rating of the circuit without raising the lamp voltage at the transient time.

The planar light-emitting module lighting circuit of the invention is characterized by comprising lamp voltage detection means for detecting a voltage applied to the lamp and a lamp current control circuit configured to limit a lamp current in a range in which the lamp voltage does not exceed a predetermined value during a period from the lighting start of the lamp to stationary lighting.

According to the configuration, the lamp current is limited in the range in which the lamp voltage does not exceed the predetermined value during a period from the lighting start of the lamp to stationary lighting, so that it is made possible to lower the output voltage rating of the circuit and stationarily light the lamp earlier.

The planar light-emitting module lighting circuit of the invention is characterized by comprising lamp voltage detection means for detecting a voltage applied to the lamp and a lamp current control circuit configured to limit a lamp power in a range in which the lamp voltage does not exceed a predetermined value during a period from the lighting start of the lamp to stationary lighting.

According to the configuration, the lamp power is limited in the range in which the lamp voltage does not exceed the predetermined value during a period from the lighting start of the lamp to stationary lighting, so that it is made possible to lower the output voltage rating of the circuit and stationarily light the lamp earlier.

An illuminating device of the invention is an illuminating device comprising a plurality of lamps lit by a plurality of the above-described planar light-emitting module lighting circuits, characterized by comprising a lamp current control circuit configured to control so that time change of lamp current becomes a same among the plurality of planar light-emitting module lighting circuits.

According to the configuration, control is performed so that time change of lamp current becomes the same among planar light-emitting module lighting circuits, whereby the brightness of each of the lamps from the lighting start to stationary lighting can be made uniform.

The illuminating device of the invention is characterized in that the lamp current control circuit controls the time change of the lamp current so as to conform to a lamp with a longest time period from the lighting start of the lamp to stationary lighting.

According to the configuration, the time change of the lamp current is controlled so as to conform to the lamp with the longest time period from the lighting start of the lamp to stationary lighting, so that the brightness of each of the lamps from the lighting start to stationary lighting can be made uniform.

An illuminating device of the invention includes any one of the planar light-emitting module lighting circuit and the lamp described above.

According to the configuration, the output voltage rating of the circuit is lowered without raising the lamp voltage at the transient time and the brightness of each of the lamps from the lighting start to stationary lighting can be made uniform.

Advantages of the Invention

As described above, according to the planar light-emitting module lighting circuit and the illuminating device of the invention, the current at the lighting start time of the lamp is made small as compared with the current at the stationary lighting time at which the predetermined time period has passed since the lighting start, so that it is made possible to lower the output voltage rating of the circuit without raising the lamp voltage at the transient time (from the lighting start to stationary lighting), and cost reduction and miniaturization of the planar light-emitting module lighting circuit and the illuminating device can be accomplished.

Control is performed so that time change of lamp current becomes the same among planar light-emitting module lighting circuits, whereby the brightness of each of the lamps from the lighting start to stationary lighting can be made uniform.

EXPLANATION OF REFERENCE 11, 21, 41 DC power source
12, 22, 42, 52, 62 Switching transistor
13, 23, 43, 53, 63 Capacitor
14, 24, 44 Current detection resistor
15, 25, 45, 55, 65 Organic electroluminescence lamp
16, 26, 32, 34, 46, 56, 66 Comparator
17, 27, 71 Ila reference value setting unit
18, 28 Lamp current control circuit
29 Voltage detection resistor
31 Logic circuit
33 Ila reference value power source
35 Vla upper limit power source
72 Maximum value selection unit

BEST MODE FOR CARRYING OUT THE INVENTION

First, an outline of the operation of a planar light-emitting module lighting circuit according to an embodiment of the invention will be discussed. In an organic electroluminescence lamp, when the temperature at the lighting start time is low, impedance is high, and if a lamp current having a similar level to that at the rating lighting time is applied, lamp voltage becomes high as compared with that at the rating lighting time. When lighting is started, as the lamp temperature rises, the impedance becomes low and the lamp voltage lowers. Thus, to supply the lamp current having a level at the rating lighting time just after the lighting start, the lighting circuit is required to have a capability for supplying a voltage higher than that at the rating lighting time.

In the invention, while the lamp temperature rises from the lighting start and the voltage to be supplied to a load lowers, lamp current is limited, thereby making it possible to lower the voltage supply capability of a circuit. Accordingly, rating decrease, cost reduction, and miniaturization of the lighting circuit can be accomplished.

Embodiment 1

Figure 1:
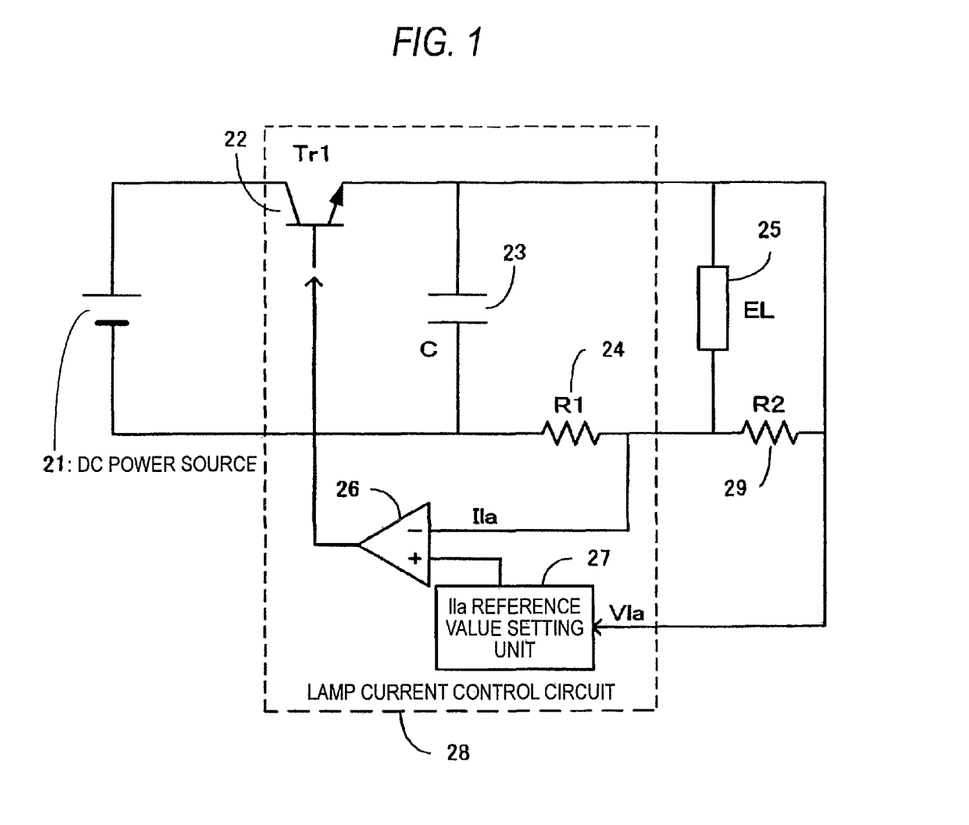
FIG. 1 is a drawing to show the configuration of a planar light-emitting module lighting circuit according to Embodiment 1 of the invention.

FIG. 1 shows the configuration of a planar light-emitting module lighting circuit according to Embodiment 1 of the invention. The planar light-emitting module lighting circuit of the embodiment includes a DC power source 21, a switching transistor (Tr1) 22, a capacitor (C) 23, a current detection resistor (R1) 24, an organic electroluminescence lamp 25, a voltage detection resistor (R2) 29, a comparator 26, and a reference value setting unit 27 for setting Ila reference value of lamp current.

Figure 2:
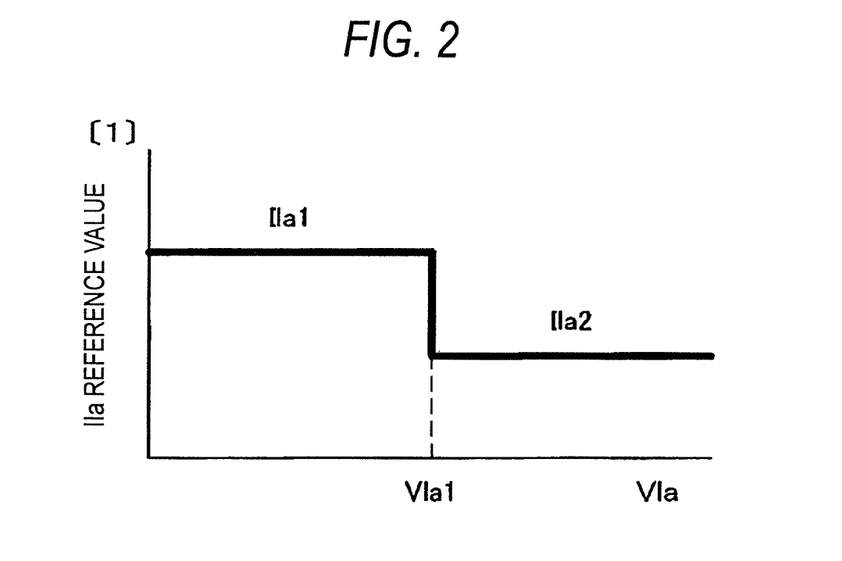
FIG. 2 is a drawing to show a setting example of Ila reference value relative to lamp voltage Vla of the planar light-emitting module lighting circuit according to Embodiment 1 of the invention.

In the embodiment, a lamp voltage Vla applied to the organic electroluminescence lamp 25 is detected by a Vla detection circuit (resistor R2: 29), and the Ila reference value setting unit 27 sets the Ila reference value as in FIG. 2 based on the detection value of the lamp voltage Vla. FIG. 2 shows a setting example of the Ila reference value relative to the lamp voltage Vla.

As shown in the figure, the Ila reference value setting unit 27 sets the Ila reference value to a lamp current Ila1 in the range in which the lamp voltage Vla is smaller than a predetermined threshold voltage Vla1, and sets the Ila reference value to a lamp current Ila2 (Ila1>Ila2) in the range in which the lamp voltage Vla is equal to or more than the predetermined threshold voltage Vla1.

Figure 3:
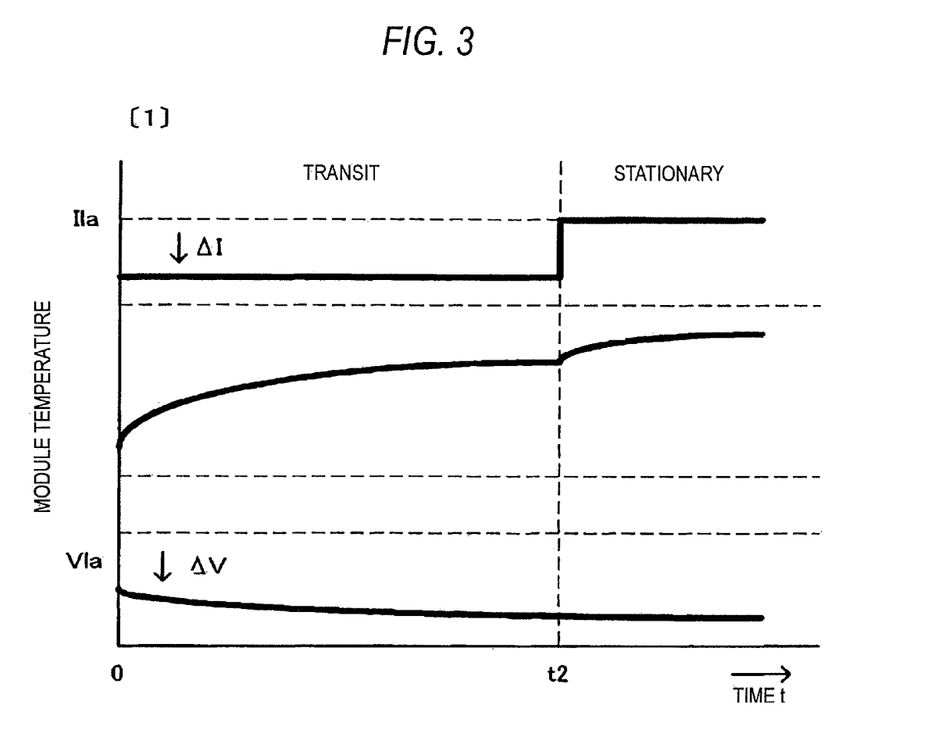
FIG. 3 is a drawing to show change in lamp current Ila, lamp (module) temperature, and lamp voltage Vla of the planar light-emitting module lighting circuit according to Embodiment 1 of the invention.

The Ila reference value set by the Ila reference value setting unit 27 based on the detection value of the lamp voltage Vla is set as in FIG. 2, whereby the lamp current Ila, the lamp (module) temperature, and the lamp voltage Vla change as in FIG. 3. As compared with the conventional example (see FIG. 11), the lamp current Ila at the transient time (from time 0 to time t2) is smaller by ΔI and thus the lamp voltage Vla also lowers by ΔV.

Next, the operation of the planar light-emitting module lighting circuit according to the embodiment will be discussed with reference to FIG. 1. The comparator 26 controls the switching transistor Tr1 (22) based on the comparison result so that the lamp current Ila detected as a voltage value by the resistor R1 (24) and the Ila reference value set by the Ila reference value setting unit 27 based on the lamp voltage Vla applied to the organic electroluminescence lamp 25 become equal (in the conventional example, the lamp voltage Vla is not detected).

In the embodiment, the Ila reference value setting unit 27 sets the Ila reference value based on the detection value of the lamp voltage Vla as shown in FIG. 2, so that the lamp current Ila at the transient time (from lighting time 0 to time t2 in FIG. 3) can be made lower by ΔI than that at the stationary lighting time (after time t2). Therefore, the lamp voltage Vla does not rise (lower by ΔV than that in the conventional example) and the output voltage (power) rating of the circuit can be lowered.

Embodiment 2

Figure 4:
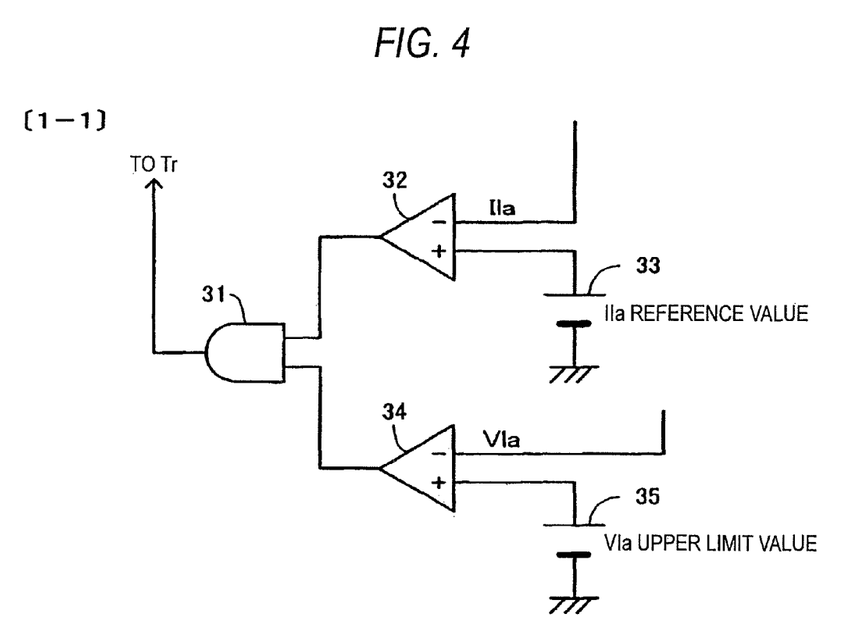
FIG. 4 is a drawing to show a control circuit in a planar light-emitting module lighting circuit according to Embodiment 2 of the invention.

FIG. 4 shows a control circuit in a planar light-emitting module lighting circuit according to Embodiment 2 of the invention. The control circuit of the embodiment includes an Ila reference value power source 33 for giving an Ila reference value of a lamp current Ila, a comparator 32 for making a comparison between the detected lamp current Ila and the Ila reference value given by the Ila reference value power source 33, a Vla upper limit power source 35 for giving a Vla upper limit value of a lamp voltage Vla, a comparator 34 for making a comparison between the detected lamp voltage Vla and the Vla upper limit value given by the Vla upper limit power source 35, and a logic circuit 31 for performing AND operation on outputs of the comparator 32 and the comparator 34.

The switching transistor Tr22 (see FIG. 1) is controlled based on AND of the output of the comparator 32 for operating so as to make equal the lamp current Ila and the Ila reference value given by the Ila reference value power source 33 and the output of the comparator 34 operating so that the lamp voltage Vla does not exceed the Vla upper limit value given by the Vla upper limit power source 35.

In the embodiment, the comparison result between the Vla upper limit value given by the Vla upper limit power source 35 and the detected lamp voltage Vla (output of the comparator 34) and the comparison result between the Ila reference value given by the Ila reference value power source 33 and the detected lamp current Ila (output of the comparator 32) are subjected to the AND operation (as output of the logic circuit 31), and the transistor (Tr1) 22 is controlled. Accordingly, it is made possible to control the lamp current Ila in the range in which the lamp voltage Vla does not exceed the Vla upper limit value given by the Vla upper limit power source 35.

Figure 5:
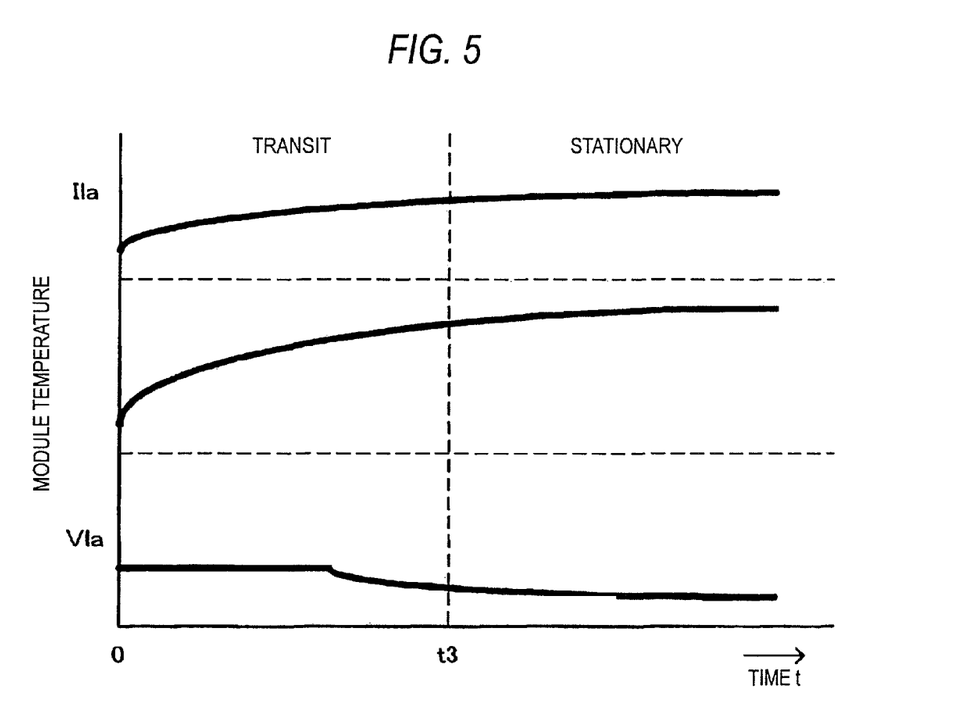
FIG. 5 is a drawing to show change in lamp current Ila, lamp (module) temperature, and lamp voltage Vla of the planar light-emitting module lighting circuit according to Embodiment 2 of the invention.

The lamp current Ila, the lamp (module) temperature, and the lamp voltage Vla become as in FIG. 5. That is, the lamp voltage Vla is limited to the Vla upper limit value given by the Vla upper limit power source 35 in the transient state from lighting time 0 to time t3, so that the lamp current Ila at the transient time can be made smaller than that at the stationary lighting time. The lamp current Ila is set to the lamp current Ila in the range in which the lamp voltage Vla does not exceed a predetermined voltage. Accordingly, in addition to the advantage that the lamp current Ila at the transient time can be made smaller than that at the stationary lighting time, stationary lighting can be performed earlier than the case of Embodiment 1.

Embodiment 3

Figure 6:
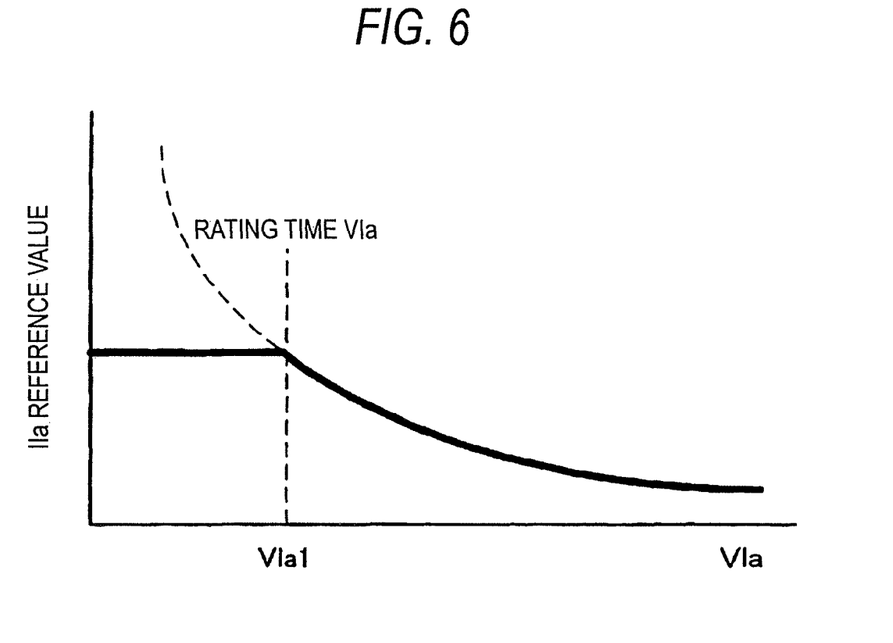
FIG. 6 is a drawing to show a setting example of Ila reference value relative to lamp voltage Vla of a planar light-emitting module lighting circuit according to Embodiment 3 of the invention.

Next, a planar light-emitting module lighting circuit according to Embodiment 3 of the invention will be discussed. The embodiment has a similar configuration to that of Embodiment 1 shown in FIG. 1 and sets Ila reference value of lamp current Ila relative to detected lamp voltage Vla as shown in FIG. 6. That is, the Ila reference value is set so that the product of the lamp voltage Vla and the lamp current Ila becomes constant.

Figure 9:
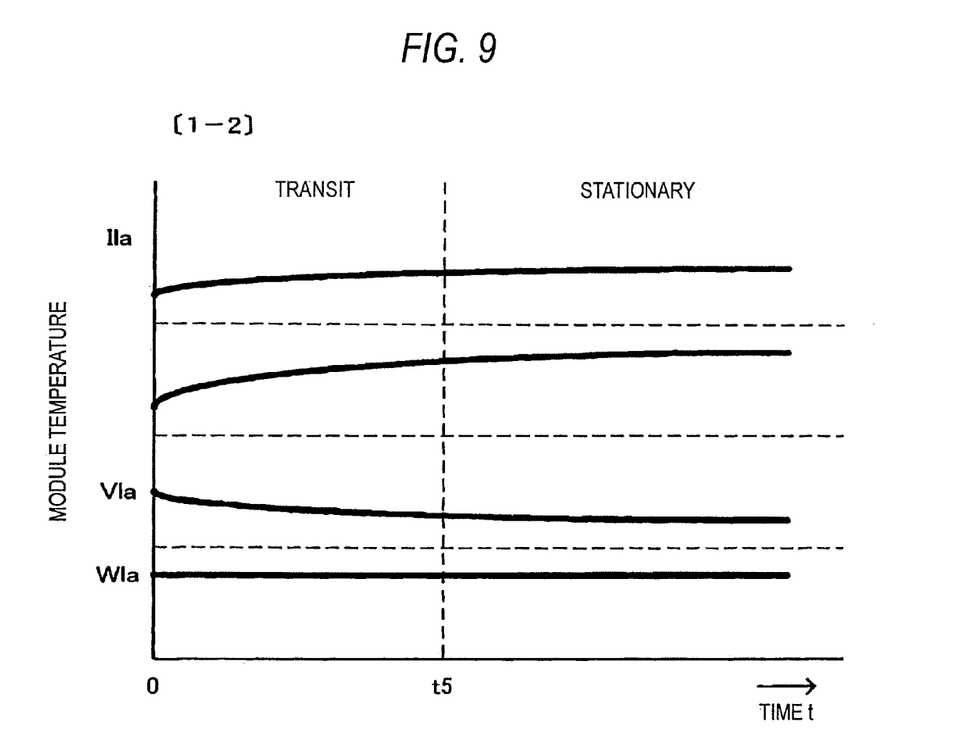
FIG. 9 is a drawing to show change in lamp current Ila, lamp (module) temperature, lamp voltage Vla, and lamp power Wla of the planar light-emitting module lighting circuit according to Embodiment 3 of the invention.

The Ila reference value is thus set, whereby lamp power Wla can be placed in a given range at the rating time or in the range of the lamp voltage Vla equal to or more than determined reference value Vla1. The lamp current Ila, the lamp (module) temperature, the lamp voltage Vla, and the lamp power Wla become as in FIG. 9. FIG. 9 shows change in the lamp current Ila, the lamp (module) temperature, the lamp voltage Vla, and the lamp power Wla at the transient time (from time 0 to time t5) and at the stationary time (after time t5).

Thus, in the embodiment, the Ila reference value of the lamp current Ila is set based on the multiplication result of the detection value of the lamp voltage Vla and the detection value of the lamp current Ila. Thus, the lamp current Ila can be set to the lamp current Ila in the range in which the lamp power Wla does not exceed predetermined power, and stationary lighting can be performed earlier than the case of Embodiment 1 in addition to the advantage that the lamp current Ila at the transient time can be made smaller than that at the stationary lighting time.

Embodiment 4

Next, a planar light-emitting module lighting circuit according to Embodiment 4 of the invention will be discussed. When a plurality of lamps are lit by a plurality of lighting circuits, if each of the lighting devices independently performs control described above in the embodiments, change in the lamp current does not become constant because of difference in temperature change of the lamps and difference in the characteristics of the lamps. Thus, unevenness occurs in brightness. Then, in the embodiment, time change of lamp current is limited to one and all lighting devices supply lamp current based on this, thereby making uniform brightness of a plurality of lamps.

Figure 7:
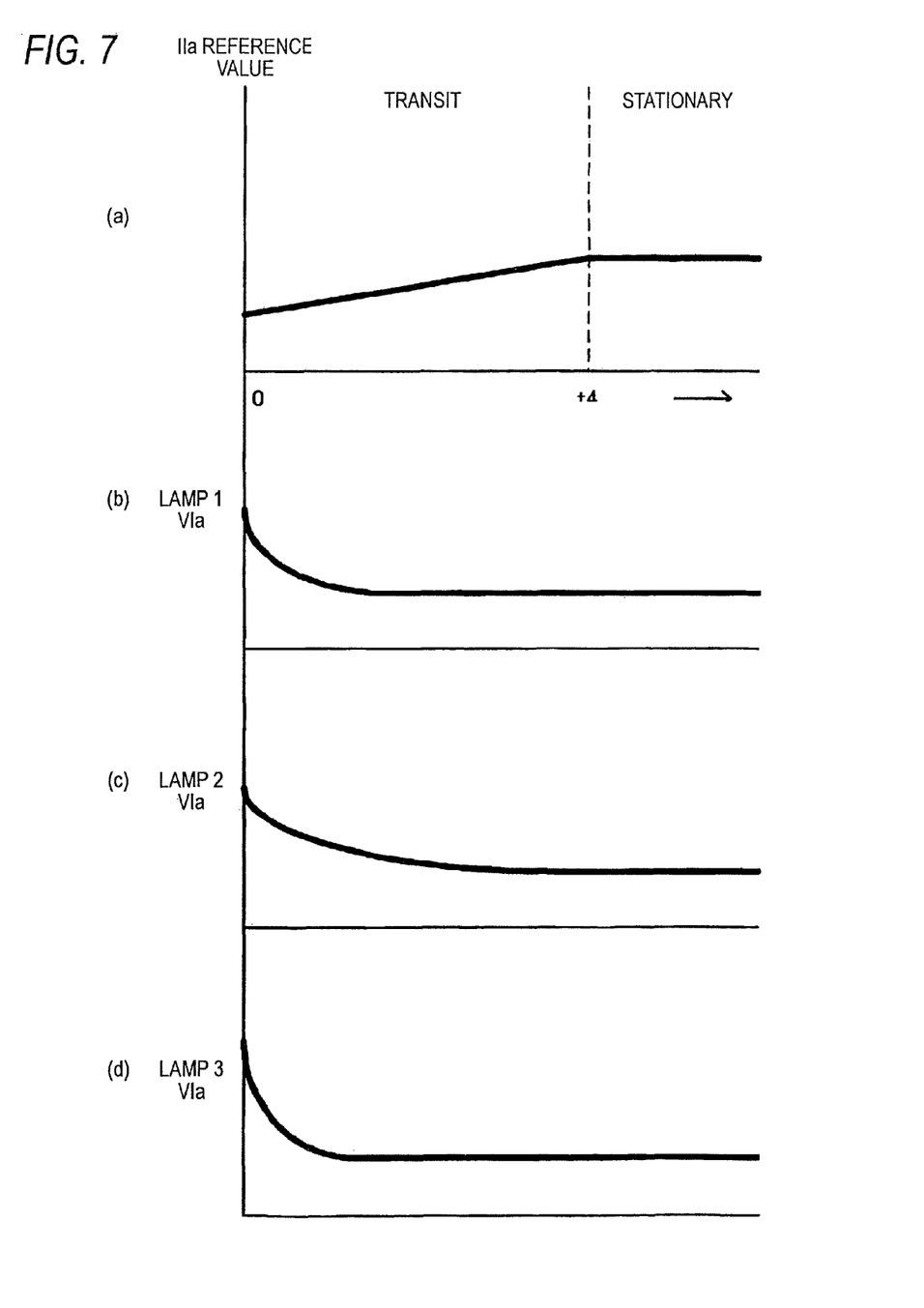
FIG. 7 is a drawing to show change in Ila reference value and lamp voltage Vla of lamps 1 to 3 of a planar light-emitting module lighting circuit according to Embodiment 4 of the invention.

For example, to control lighting of three lamps, lamp current Ila is supplied in time change shown in FIG. 7 (a). That is, time change of the lamp current Ila for the three lamps is limited to the time change shown in FIG. 7 (a). In this case, as shown in FIG. 7 (b) to (d) to represent lamp voltages Vla of lamps 1 to 3, the lamps show different change in the lamp voltage Vla because of difference in the installation environment and the characteristic, but the lamp current Ila is the same and thus the brightness is constant.

That is, in the embodiment, to light a plurality of modules, the lamp current Ila at the transient time is made smaller than that at the stationary time and in addition, the change curve of time vs lamp current is made constant (independently of the lamp voltage Vla). Accordingly, rising of light at the transient lighting time of a plurality of modules can be made uniform.

The configuration of the embodiment is similar to the configuration of Embodiment 1 shown in FIG. 1 and the Ila reference value set by an Ila reference value setting unit 27 is made constant relative to the time as in FIG. 7 (a). Lamps 1 to 3 vary in a temperature rise because of difference in the in-appliance installation environment, etc., for example, and thus change in the lamp voltage Vla varies. However, since the luminance is determined by the lamp current Ila, change in brightness accompanying the time passage becomes constant independently of change in the lamp voltage Vla.

Embodiment 5

Next, a planar light-emitting module lighting circuit according to Embodiment 5 of the invention will be discussed. In the embodiment, when a plurality of lamps are lit, lamp current Ila is supplied conforming to the lamp with the slowest lowering of lamp voltage Vla.

Figure 8:
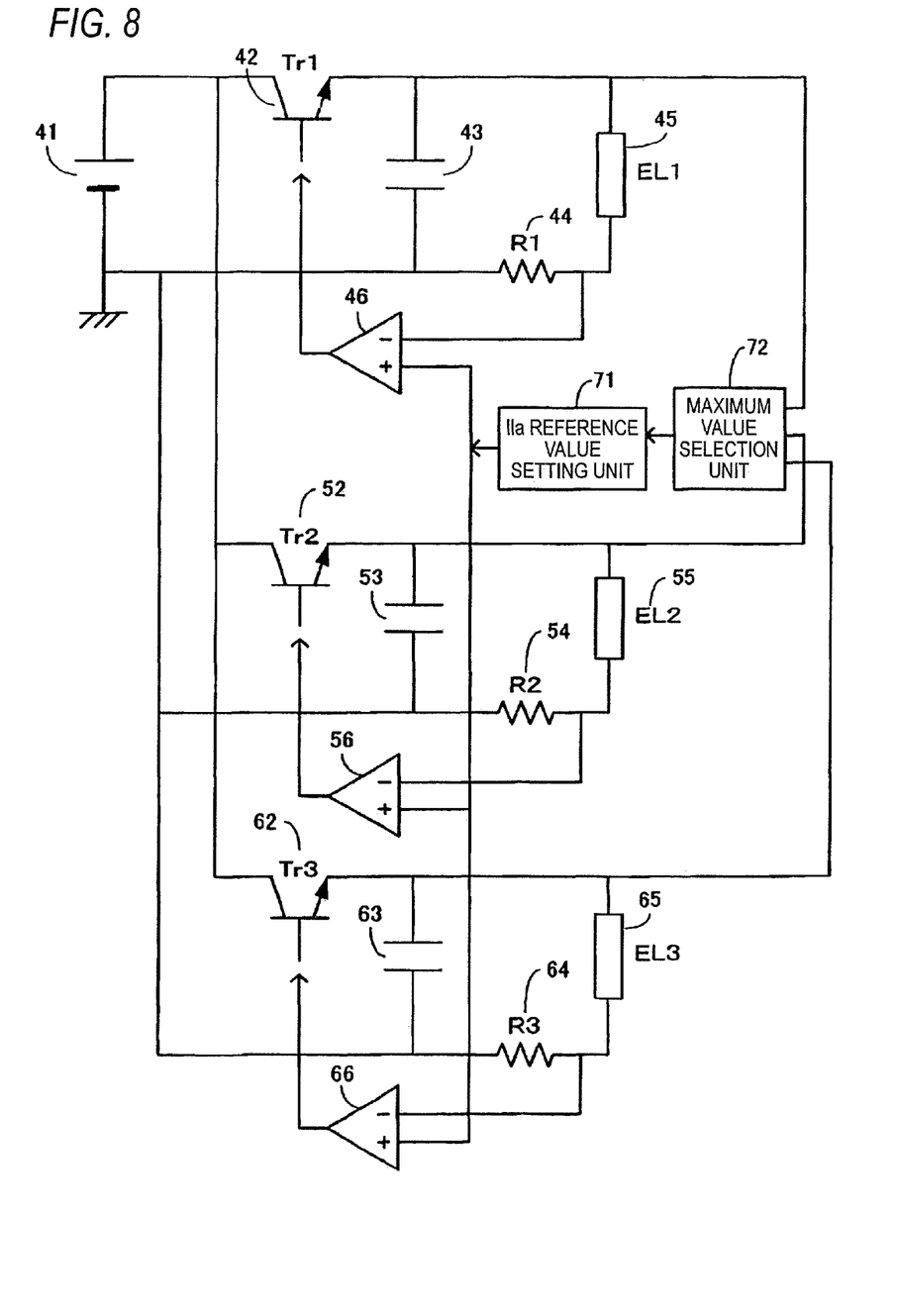
FIG. 8 is a drawing to show the configuration of a planar light-emitting module lighting circuit according to Embodiment 5 of the invention.

FIG. 8 shows the configuration of the planar light-emitting module lighting circuit of the embodiment. The planar light-emitting module lighting circuit of the embodiment has a DC power supply 41, switching transistors (Tr1) 42, (Tr2) 52, and (Tr3) 62, capacitors (C) 43, 53, and 63, current detection resistors (R1) 44, (R2) 54, and (R3) 64, organic electroluminescence lamps (electroluminescence 1) 45, (electroluminescence 2) 55, and (electroluminescence 3) 65, comparators 46, 56, and 66, a reference value setting unit 71 of the lamp current Ila, and a maximum value selection unit 72 of the lamp voltage Vla.

In the circuit configuration shown in FIG. 8 (for example, three lamps), the lamp voltage Vla of each lamp is detected, the maximum value of the lamp voltage Vla is selected in the maximum value selection unit 72, and Ila reference value is set by the Ila reference value setting unit 71. The lamp voltage Vla-Ila reference value at this time may be similar to in FIG. 2 (Embodiment 1) or FIG. 6 (Embodiment 3). The maximum value of the lamp voltage Vla is used as the reference and control can also be performed so that the lamp voltage Vla does not exceed the upper limit value according to control similar to that of Embodiment 2 (FIG. 4, 5).

Thus, in the embodiment, to light a plurality of modules, the lamp current Ila is supplied to all modules in a time change curve of the lamp current Ila reference value of the module with the longest transient state. In this case, the circuit operation for each module is similar to that in Embodiment 1 and Embodiment 3 and the reference value of the lamp current Ila is common to all modules. The lamp voltage Vla of each module is detected and the Ila reference value is set according to the curve in FIG. 4 or FIG. 5 based on the maximum value.

For the organic electroluminescence lamp, if the lamp voltage Vla is high, lamp current is hard to flow, the temperature lowers, and the transient lighting state is prolonged. However, according to the embodiment, change in the Ila reference value of all modules is made uniform, so that change in brightness can be made uniform.

Industrial Applicability

The invention can be used as a planar light-emitting module lighting circuit and an illuminating device and in particular as a planar light-emitting module lighting circuit and an illuminating device that can lower the output voltage rating of a circuit and can make uniform the brightness of a lamp from lighting start to stationary lighting.

The invention claimed is:

1. A planar light-emitting module lighting circuit which uses a lamp comprising an organic electroluminescence layer and electrodes sandwiching the organic electroluminescence layer as a load, and which applies a current to the load so as to cause the organic electroluminescence layer to emit light,
wherein a current at a lighting start time of the lamp is smaller as compared to a current at a stationary lighting time at which a predetermined time period has passed since the lighting start time.

2. The planar light-emitting module lighting circuit according to claim 1, comprising:
a lamp voltage detection unit configured to detect a voltage applied to the lamp; and
a lamp current control circuit configured to limit a lamp current during a period in which the lamp voltage is equal to or more than a predetermined value.

3. The planar light-emitting module lighting circuit according to claim 1, comprising:
a lamp voltage detection unit configured to detect a voltage applied to the lamp; and
a lamp current control circuit configured to limit a lamp current in a range in which the lamp voltage does not exceed a predetermined value during a period from the lighting start of the lamp to stationary lighting.

4. The planar light-emitting module lighting circuit according to claim 1, comprising:
a lamp voltage detection unit configured to detect a voltage applied to the lamp; and
a lamp current control circuit configured to limit a lamp power in a range in which the lamp voltage does not exceed a predetermined value during a period from the lighting start of the lamp to stationary lighting.

5. An illuminating device comprising a plurality of organic electroluminescent lamps lit by a plurality of the planar light-emitting module lighting circuits, each of the planar light-emitting module lighting circuits including:
a device which applies a current to the corresponding organic electroluminescent lamp so as to cause the organic electroluminescence layer to emit light, the circuit configured such that a current at a lighting start time of the lamp is smaller as compared to a current at a stationary lighting time at which a predetermined time period has passed since the lighting start time,
wherein the illuminating device comprises a lamp current control circuit configured to control such that time change of lamp current becomes a same among the plurality of planar light-emitting module lighting circuits.

6. The illuminating device according to claim 5,
wherein the lamp current control circuit controls the time change of the lamp current so as to conform to a lamp with a longest time period from the lighting start of the lamp to stationary lighting.

7. The planar light-emitting module lighting circuit according to claim 1, wherein the predetermined time period ends at a time instant in which a temperature of the lamp remains constant.

8. The planar light-emitting module lighting circuit according to claim 1, wherein the current of the lamp during the predetermined time period is smaller than the current of the lamp during the stationary lighting time.

9. An illumination device comprising:
a plurality of lamps, each comprising an organic electroluminescence layer and electrodes sandwiching the organic electroluminescence layer as a load; and
a plurality of planar light-emitting module lighting circuits configured to apply a current to the respective lamps so as to cause the organic electroluminescence layer to emit light, wherein each of the plurality of lamps comprises a lamp current control circuit configured to control a current at a lighting start time in a transient time of the lamp to be smaller as compared to a current at a start of a stationary lighting time at which a predetermined time period has passed since the lighting start time, wherein the lamp current control circuit detects a lamp voltage value of the corresponding lamp, wherein the lamp current control circuit sets a reference value of the lamp current common to all the planar light-emitting module lighting circuits so as to correspond to the maximum value of the detected lamp voltage values of the plurality of lamps such that time change of lamp current conforms to a lamp with a longest time period from the lighting start of the lamp to stationary lighting, whereby time change of lamp current becomes a same among the plurality of planar light-emitting module lighting circuits.

* * * * *